US006062281A

United States Patent [19]

Dockter et al.

[11] Patent Number: 6,062,281

[45] Date of Patent: May 16, 2000

[54] VERTICAL ARBOR SAW FOR SHAPE SAWING A LOG

[75] Inventors: Mike Dockter, Kelso; Michael P. Knerr, Ridgefield, both of Wash.

[73] Assignee: U.S. Natural Resources, Vancouver, Wash.

[21] Appl. No.: 09/311,604

[22] Filed: May 13, 1999

[51] Int. Cl.[7] .................................. B23Q 1/00; B27C 9/00

[52] U.S. Cl. .............................. 144/357; 83/368; 83/371; 144/3.1; 144/39; 144/367; 144/369

[58] Field of Search ................................ 144/3.1, 39, 41, 144/356, 357, 367, 369, 242.1, 246.1, 250.25, 382, 408; 83/368, 370, 371, 425.3, 425.4, 508.3

[56] References Cited

U.S. PATENT DOCUMENTS

| | | | |
|---|---|---|---|
| 4,358,978 | 11/1982 | Lawson . | |
| 4,440,203 | 4/1984 | Ostberg . | |
| 4,449,557 | 5/1984 | Makela . | |
| 4,485,861 | 12/1984 | Nilsson . | |
| 4,548,247 | 10/1985 | Eklund . | |
| 4,572,256 | 2/1986 | Rautio . | |
| 4,690,188 | 9/1987 | Hasenwinkle . | |
| 4,881,584 | 11/1989 | Wislocker . | |
| 4,947,909 | 8/1990 | Stroud . | |
| 5,148,847 | 9/1992 | Knerr . | |
| 5,320,153 | 6/1994 | Knerr . | |
| 5,400,842 | 3/1995 | Brisson . | |
| 5,435,361 | 7/1995 | Knerr . | |
| 5,722,474 | 3/1998 | Raybon . | |
| 5,761,979 | 6/1998 | McGehee . | |
| 5,765,615 | 6/1998 | Chapman et al. | 144/357 |
| 5,884,682 | 3/1999 | Kennedy et al. | 144/250.23 |
| 5,946,995 | 9/1999 | Michell et al. | 144/39 |

*Primary Examiner*—W. Donald Bray

*Attorney, Agent, or Firm*—Robert L. Harrington

[57] ABSTRACT

A processing system for processing logs having a curvature into lumber pieces. The system has a cutting station including a saw box with a chipper and a vertical arbor saw mounted to the saw box. The saw box is movable upwardly and downwardly and angularly for tilting. The movement of the saw box orients the chipper relative to the log and provides the capability of the saw to follow a curved saw path. A scanner scans the log and a computer processes the scan data to determine the optimum saw path.

10 Claims, 5 Drawing Sheets

VERTICAL ARBOR SAW FOR SHAPE SAWING A LOG

FIELD OF THE INVENTION

This invention relates to a shape sawing system for sawing a curved log using a conventional conveyor mechanism and a vertical arbor saw blade that adjusts angularly and vertically during sawing of the log.

BACKGROUND OF THE INVENTION

This invention particularly relates to shape sawing of a log, cant or similar lumber piece (collectively referred to as a log) which is curved in one plane. It is desirable to remove lumber slabs or boards from the log by sawing along the curvature to provide boards having parallel and curved faces that follow the log curve. Such maximizes the boards that can be cut from the log which are subsequently straightened. This process in general is referred to as shape sawing.

There are numerous patents that have issued on various shape sawing techniques. Such techniques include (a) feeding of the log along a curved conveyor path that is established to substantially match the curve of the log; (b) conveying the curved logs along a linear path and then continuously moving (angularly and laterally) a vertical gang of saw blades (mounted on a horizontal arbor) to orient the saws to follow the curvature of the log; and (c) a combination of the first two mentioned.

Each of the known techniques has problems, a common one of which is the need to provide special conveying systems. It is an object of the present invention to simplify the conveyor system in part by incorporating existing conveyors, e.g, sharp chain conveyors, that are typically in use for other functions preceding the sawing operation such as scanning.

BRIEF DESCRIPTION OF THE INVENTION

In the preferred embodiment of the invention, the conveyor system is designed to receive logs with the primary curvature in a vertical plane with the horns of the logs (the log ends) impinged onto the spikes of the sharp chain, and overhead press rollers retaining the orientation of the logs with the concave side of the log facing downwardly. The sharp chain conveyor extends to a position near a cutting station, and then side rollers take over to convey the log into and through the cutting station.

The cutting station includes a chipper head and a gang of saw blades mounted in a saw box. The box is mounted for controlled up and down movement to follow the curve of the log and for controlled angular movement in a vertical plane to angularly orient the saw blades to align the blades with the tangent of the curved kerf being cut. The saws and chip or chipper heads are designed to cut in a horizontal plane (the arbor for the saws being substantially vertical, i.e., it pivots forward and backward to accommodate the curve of the log but nevertheless is maintained in a close to vertical position which is referred to hereafter as vertical). The position and configuration of the log, having been previously scanned, is known to a computer that has determined the desired cutting lines and controls the box and thus the saws and chippers for cutting along the desired cutting lines.

As the log is presented to the saw box, the box is oriented in height and angle to set the saw blades in the desired position and alignment to cut along the pre-determined cut lines. As the log proceeds through the saw box, the saws are continuously adjusted in both height and angle to produce the desired cut along the pre-determined cut lines. The saw blade (or blades) is linearly/vertically adjustable on the arbor and relative to the saw box and thus relative to the chipper head. This adjustment maintains the desired relationship between the chipper head and adjacent saw blade. (The spacing between chipper head and adjacent saw blade can change as the box is tilted and in this preferred embodiment needs to be continuously adjusted.)

A benefit of the invention is the substantially reduced equipment required as compared to prior shape sawing systems and accordingly the space consumption of the shape sawing apparatus is substantially reduced. Other advantages and improvements will become apparent upon reference to the following detailed description and drawings referred to therein.

DESCRIPTION OF THE PREFERRED EMBODIMENT

Figure 1:
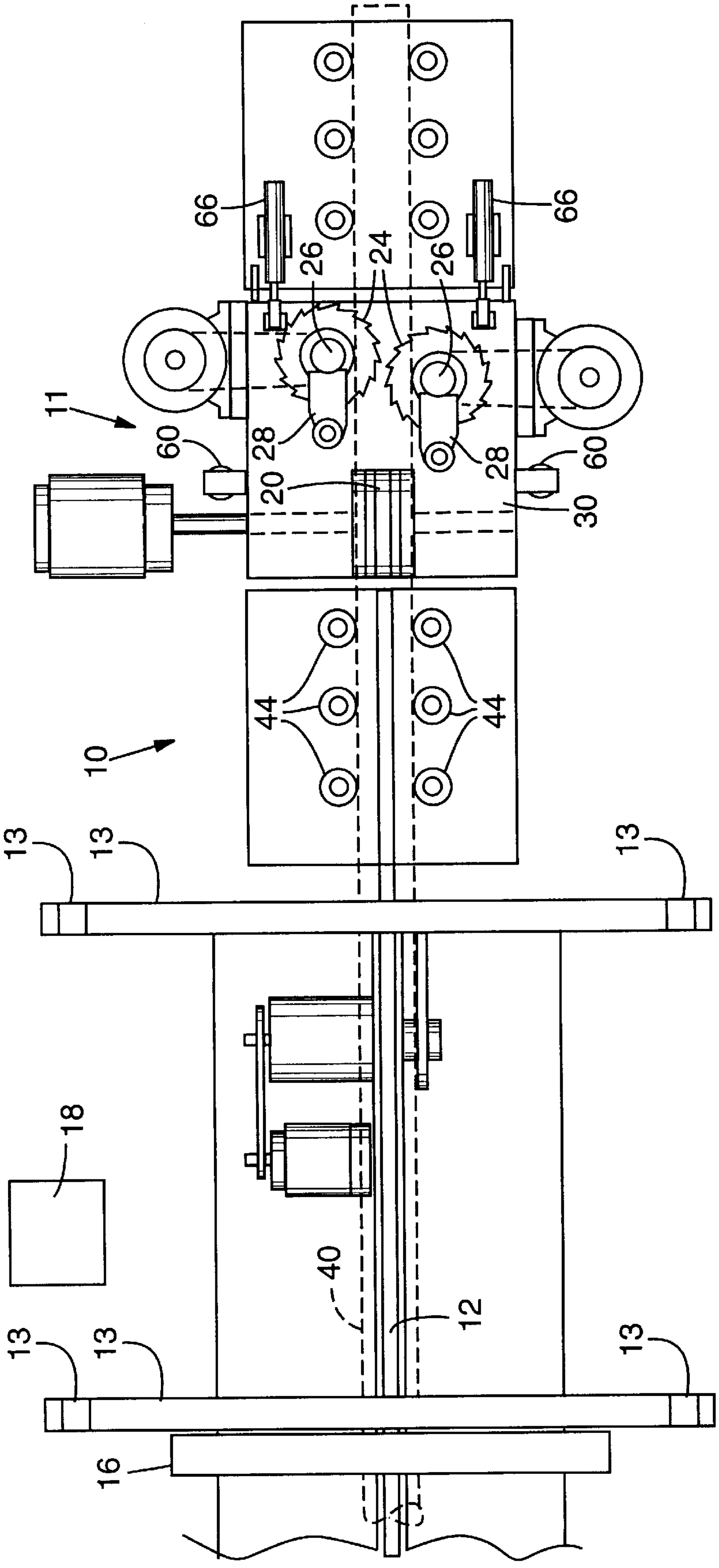
FIG. 1 is a top plan view of a lumber processing system in accordance with the invention.
Figure 2:
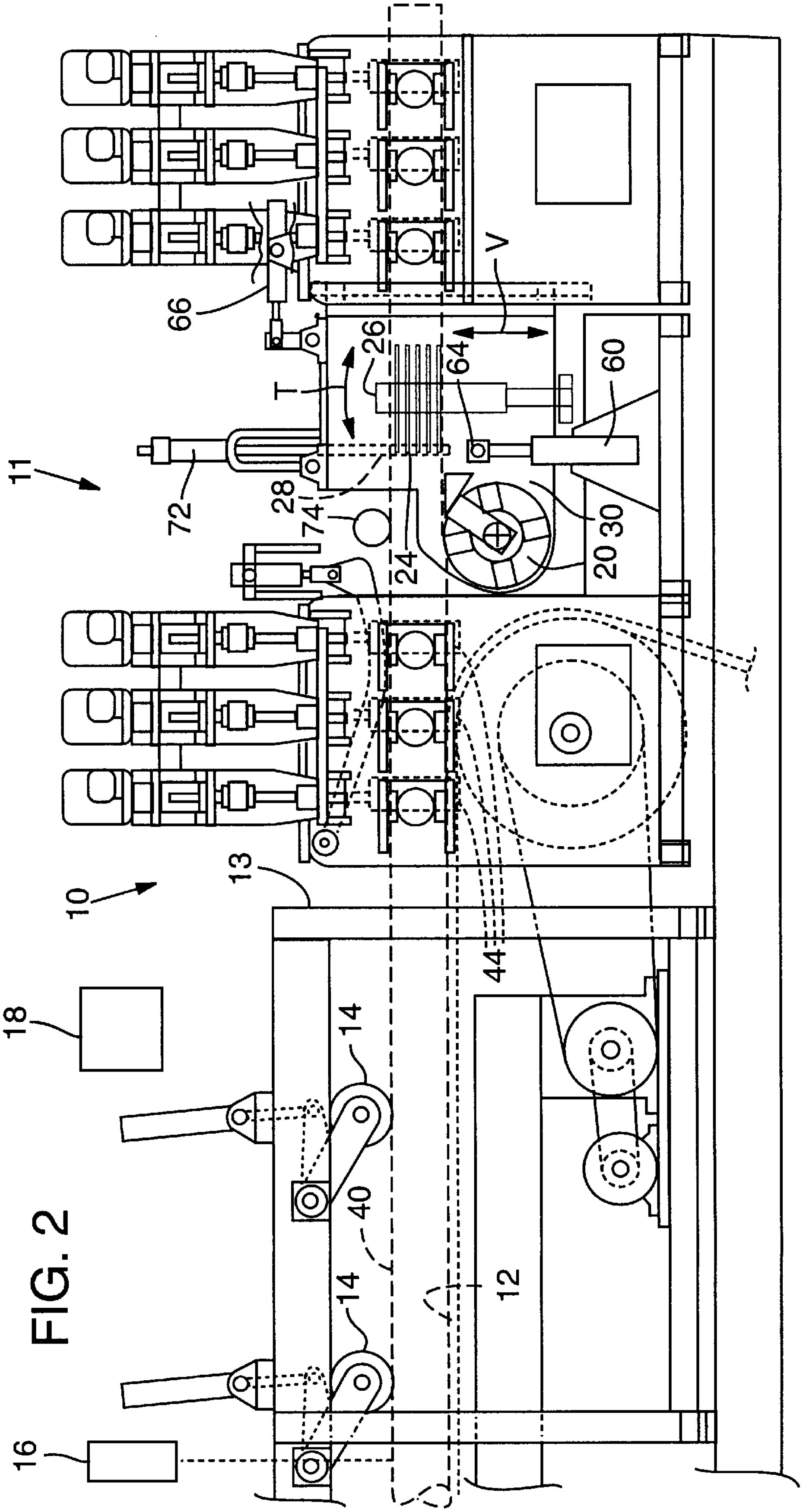
FIG. 2 is a side elevation view of the processing system of FIG. 1.

FIGS. 1 and 2 illustrate a processing system 10 that converts logs (encompassing cants and similar lumber pieces) into lumber products. Certain features are eliminated from one or the other of FIGS. 1 and 2 for illustration purposes and accordingly FIGS. 1 and 2 are not totally consistent one with the other. The system 10 has a first conveyor that includes a sharp chain 12 and hold down rollers 14 (shown in FIG. 2 only, the rollers being supported by support members 13), for transporting a log to a cutting station 11. The system 10 includes a scanner 16 that is provided to scan the log as it is being transported on the sharp chain 12. The scanner 16 provides the data to enable a determination of the position of the log on the sharp chain 12 and further to determine the profile of the log. The scanner inputs the scan data into a computer 18. Whereas the present systems typically all use "scanners", the purpose is to generate a computerized replica of the log. Prior devices sometimes used contact sensing devices. Other forms of sensing devices may be developed and the term sensing device is intended to encompass scanners and other forms of replicating devices.

The cutting station 11 includes a bottom chipper 20 and a gang saw 24 mounted on a vertical arbor 26 that processes the log into lumber pieces such as boards. The bottom chipper 20 and the arbor 26 and thereby the gang saw 24, are mounted to a common adjustable structural member referred to as a saw box 30. The saw box 30 is vertically movable as indicated by arrow V and also has the capability of being tilted as indicated by arrow T (FIG. 2). These two adjustments enable the proper positioning of the bottom chipper and the gang saw as will be explained.

Figure 3:
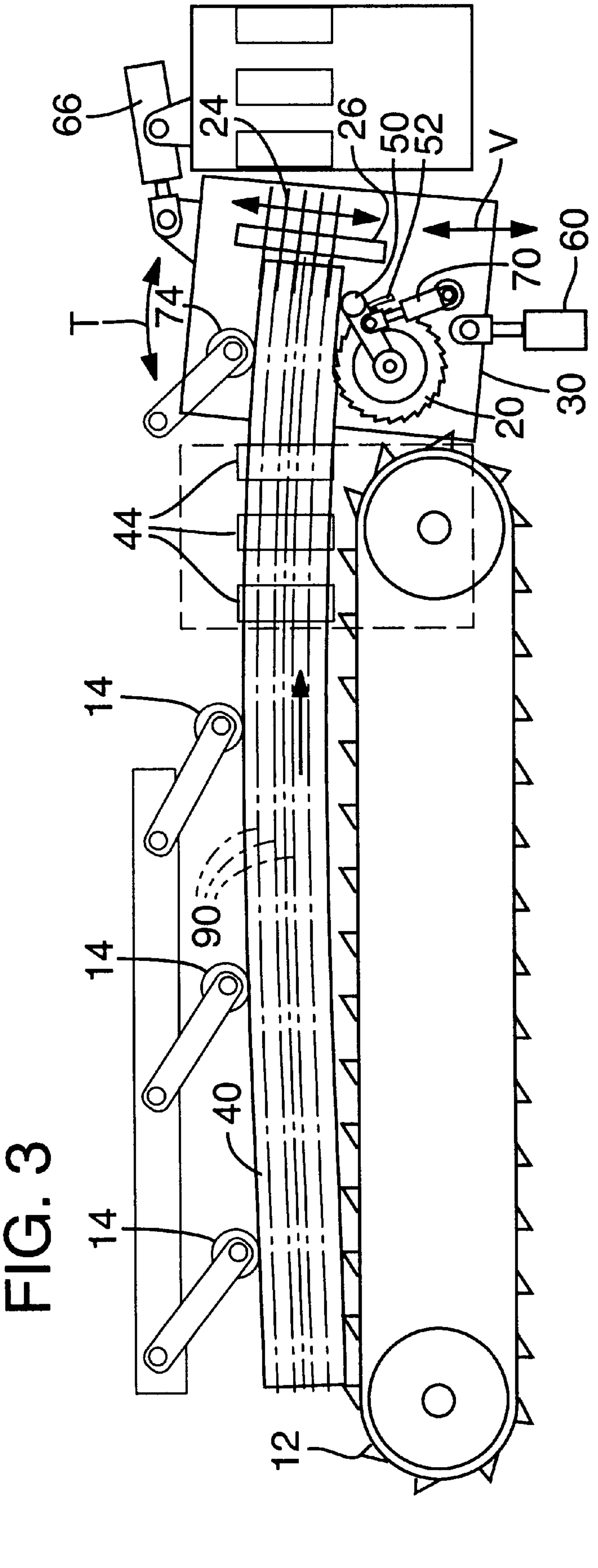
FIG. 3 is a schematic illustration of the processing line of FIGS. 1 and 2 illustrating a log being conveyed into a cutting station.

Refer now to FIG. 3 of the drawings. Illustrated is a curved log 40 in the process of being conveyed on the sharp chain conveyor 12. In this embodiment the curved log 40 is placed on the conveyor in "horns down" position, that is, the curvature lies substantially in the vertical plane with the ends of the log 40 in contact with the sharp chain 12. Log 40 is conveyed and held in position by the sharp chain 12 and the hold down rollers 14. As explained, as the log 40 is conveyed on the conveyor, the scanner 16 will scan the log 40 and the computer 18 processes the scan data from the scanner 16 to determine the profile of the log and then the optimum cutting lines 90 that will fit that profile to maximize the recovery of usable boards from the log 40. (Maximize here encompasses either greatest number of boards recovered or boards having the greatest value.) The computer 18 accordingly determines the desired movement and operation of the saw box, saws and chippers to achieve cutting of the chipper heads and saws along the cutting lines 90.

A feed-through conveyor for feeding the logs through the cutting station 11 has vertical side gripping rollers 44 positioned near the exit end of the sharp chain 12 which grips and guides the log 40 in a straight line as the log 40 exits the sharp chain 12. The saw box 30 is movable upwardly and downwardly and is also tiltable to properly maintain the bottom chipper at its corresponding correct depth of cut as well as to position or orient the saw blades 24 at the correct approach angle. That is, the saw blades will be positioned to approximate a tangent to the cutting line path. In addition, the saw blades 24 are adjustably movable on its vertical arbor 26. Such movement is produced by cylinder 72 moving the saw guides 28 which control the positioning of the saw blades. The saw blades 24 thus may be adjusted relative to the chipper 20 independent of the movement of the saw box 30.

An anvil 50 is provided strategic to the bottom chipper 20. The anvil 50 is adjustably movable to engage and support the bottom of the log and in cooperation with side rollers 44, provide a continued linear feeding of the logs into and through the cutting station. As the leading end of the log approaches the end of the sharp chain conveyor, it is first gripped by rollers 44 (which prevents the belly of the log from dropping down onto the sharp chain) and following opening of the log bottom by the chipper 20, the anvil 50, by adjustment, is adjustably positioned to track the log bottom, i.e., it raises and lowers with the curvature of the log bottom as dictated by the computer, to thereby assist the linear feeding of the log through the cutting station. A chip deflector 52 is incorporated with the anvil 50 and is movable with the anvil 50. The chip deflector 52 will deflect the chips generated by the bottom chipper 20 away from the gang saw 24.

Figure 4:
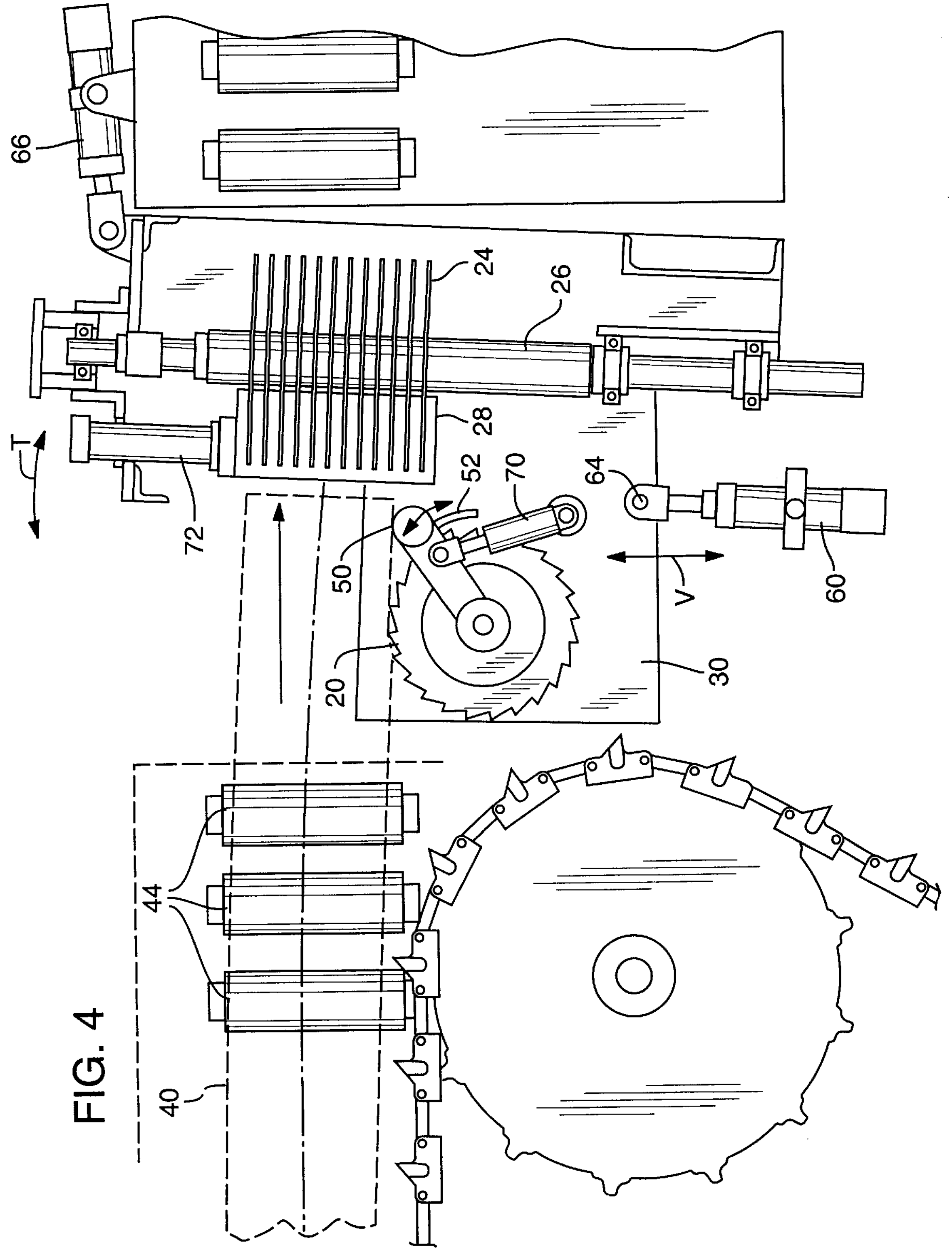
FIG. 4 is a schematic view of a saw station of the processing system of FIGS. 1 and 2.

FIG. 4 further illustrates (in a side view) a saw box 30 having a bottom chipper 20 and a gang saw 24. The saw box has positioning mechanism (cylinders 60 and 66) that is controlled by the computer 18 to coordinate the movement of the components mounted to the box. The saw box 30 is provided with adjustability to enable the matching of the saws and chipper head to the curvature of the log by the cooperative action of cylinders 60 and 66. The pivot points 60' and 66' are cooperatively adjusted by the cylinders 60 and 66 to provide vertical (for the height alignment) and tilting (for angular alignment) of the box for desired positioning of the lower chipper head 20. This substantially positions the saws, with final adjustment provided by cylinder 72. A press roll 74 is provided at the top of the log in line with the bottom chipper 20. The press roll 74 engages the top of the log to counter the upwardly directed face of the chipper head 20 and thus helps to maintain the log in position.

Figure 5:
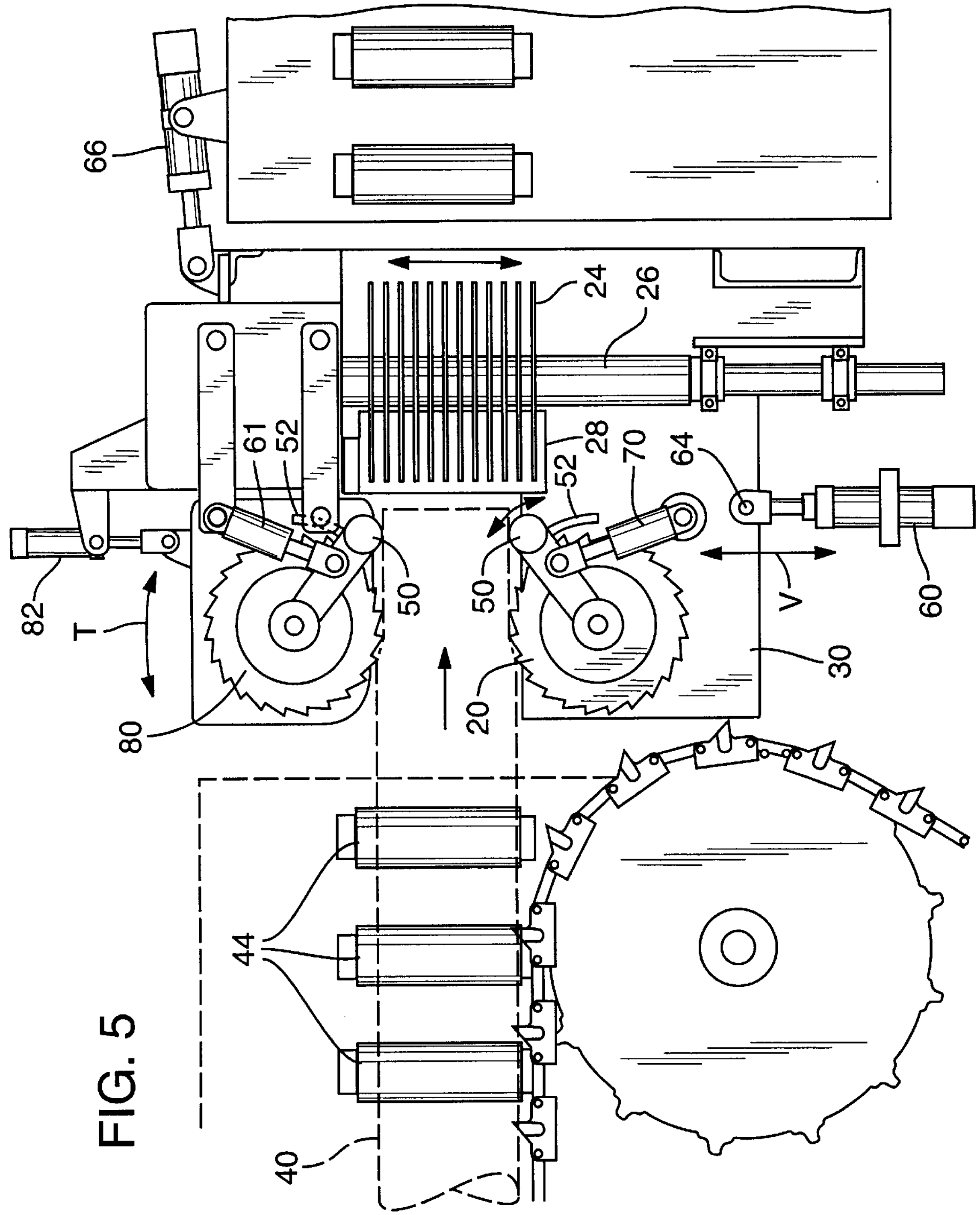
FIG. 5 is a schematic view of another embodiment of the saw station of FIG. 4.

FIG. 5 illustrates another embodiment of a saw box 30. The saw box 30 of FIG. 5 has an upper chipper head 80 which is provided to open up the side face on the upper surface of the log 40. It also replaces press roll 74. The upper chipper head 80 is adjustable upwardly and downwardly by a cylinder 82. Another anvil 50 is provided strategic to the upper chipper 80 and is adjustably movable by a cylinder 61.

Refer again to FIG. 3 of the drawings. As the log 40 is being conveyed and held in its adjusted position by the sharp chain 12 and the rollers 14, the scanner 16 (FIG. 2) scans the log 40 with the scan data being input to the computer 18. From the scan data input to the computer 18, optimum saw cut lines 90 through the log 40 are determined. The saw cut lines 90 are indicated by the dash lines superimposed on the log 40 in FIG. 3. It will be appreciated that a saw cut line 90 is provided for each of the saw blades 24 and the chipper head with the saw cut lines being parallel to each other. That is, each board generated by the multiple saws will have the same thickness.

It will also be appreciated that the saw box 30 will be moved on a continuous basis so that the bottom chipper will continue to follow its prescribed saw cut line 90. The saws are substantially positioned by the same adjustment of the saw box 30 except for the fine adjustment provided by cylinder 72 to accommodate the spacing differential between the chipper head and saws generated by tilting of the saw box. The anvil 50 is adjusted by the cylinder 60 so that the generated flat created by the bottom chipper 20 will be supported by the anvil 50 which in turn will guide the log 40 along a consistent linear path into the saw 24.

Since the log 40 in the illustration is curved and the optimum saw lines 90 are accordingly curved, the saw blades 24 are continuously adjusted by the cylinders 60, 66 and 72 such that the plane of the saws 24 will be substantially tangent to the saw cut lines 90.

As will be appreciated from the foregoing, the benefit of the present invention, e.g., reducing the conveyor equipment necessary to achieve "shape sawing", is achieved by sawing in a horizontal rather than vertical plane. Heretofore shape sawing has been achieved with the curve of the log in a horizontal plane. Adjustments to the saws (and chipper heads when incorporated) were lateral adjustment (linearly and angularly) as the curve of the log dictated side-to-side movement of the cutting components.

By maintaining the curve of the log in a vertical plane and cutting horizontally, the major portion of the conveyor can be standard with only a few feet preceding the cutting station having to be specially designed for the shape sawing function. To accommodate horizontal shape sawing (or vertical arbor sawing as it is sometimes referred to), the cutting components (saws and chipper heads as applicable) have to be adjusted vertically up and down and pivotally so as to follow, e.g., the concave arc of the log. That is, as the log enters the saw station, the blades will be angled upwardly front to back toward the apex of the curve. The angle is constantly adjusted as the saw rises toward the apex until the blade passes through the horizontal position and then is angled downwardly front to back as the blade continues to follow the curve downwardly toward the rear or exit end of the log. It will be appreciated, however, that a curved log may have complex curves, e.g., an S shape, and the invention applied to curved logs in general, i.e., where a portion of the curvature can be oriented in a vertical plane.

The preferred embodiment provides these movements by mounting the chippers and saws on a saw box that is provided with positioners that both pivot and vertically move the saw box and thus the chippers and saws. The saw blades are laterally aligned and the chipper is positioned forward of the blade. Thus the chipper is following the curvature of the log at a point rearward of the saws (forward and rearward being relative to movement of the log). Whereas this spacing can be accommodated by relative positioning of the saws and chipper head on the saw box for any specific angular setting of the saw box, as the saw box is tilted, that relationship changes and a further positioning mechanism is applied to the saws (or saw guide) to maintain the desired relationship regardless of the tilt of the saw box.

Obviously this further positioning can be applied to the chipper head rather than the saws. Saw positioning is preferable because of the desired adjustment of the saw for other purposes (but probably not during the cutting process), e.g., for positioning a different blade of the set of blades into the end position, the previous end saw having been dulled and thus is shifted out of operation. Such is but one example of the additional use of saw blade positioners.

It is contemplated that totally independent positioning of the saws and chipper head (not caused by a saw box) will accomplish this same objective. Further, the manner of achieving the positioning of the saws, chipper heads and/or saw box can be varied. It may be desirable to have the positioners (cylinders) at varied and different positions (e.g., for stability) as long as they achieve the desired cooperative raising/lowering and tilting of the components during the cutting operation. Whereas two cylinders are considered preferable, other factors may induce, e.g., the use of three or more positioners or even a single positioner if that positioner is capable of producing the duplicate maneuvers described.

Those skilled in the art will recognize that such modifications and variations may be made without departing from the true spirit and scope of the invention. The invention is therefore not to be limited to the embodiments described and illustrated but is to be determined from the appended claims.

The invention claimed is:

1. A shape sawing system comprising:

a first conveyor conveying curved logs having a convex side and an opposed concave side oriented on the conveyor with one of the curved sides of the log vertically overlying the other;

a scanning device for sensing the position and profile of the logs and a computer receiving information from the sensing device and determining desired cutting lines of the logs;

a cutting station receiving the logs from the conveyor in the position wherein one curved side overlies the other curved side;

a second conveyor conveying the logs through the cutting station, at least one cutting saw at said cutting station and mounted on a vertical arbor cutting each log to produce a horizontal board face that follows the curvature of the log; and positioning mechanism connected to the saw, the positioning mechanism receiving information from the computer and providing ongoing vertical movement and tilting movement of the saw during cutting as instructed by the computer to produce the desired cutting lines.

2. A shape sawing system as defined in claim 1 including:

a chipper head mounted in said cutting station and controlled by said positioning mechanism to produce corresponding vertical and tilting movement of said chipper head, said chipper head opening one face of the log.

3. A shape sawing system as defined in claim 2 including:

a second chipper head mounted in said cutting station and controlled by said positioning mechanism to produce corresponding vertical and tilting movement of said second chipper head and a second positioning mechanism controlled by said computer to further position said second chipper head at a desired parallel spaced apart relation relative to said first chipper head to open the opposite side of the log along a computed cutting line.

4. A shape sawing system as defined in claim 1 wherein:

said at least one said saw comprises a plurality of saws commonly mounted to an arbor in parallel spaced apart relation and cutting a plurality of boards from certain of said logs.

5. A shape sawing system as defined in claim 4 wherein a saw box carries the arbor and positioning motors position the saw box and thereby provide the positioning mechanism to raise, lower and tilt the saws as dictated by the computer.

6. A shape sawing system as defined in claim 4 wherein a positioning mechanism comprises hydraulic cylinders, pivotal support arms and bell cranks that cooperatively provide vertical and tilting movement of the saw box in response to computer directed operation of the hydraulic cylinders.

7. A method of sawing boards from a curved log, the boards having sawn faces following the curvature of the log including:

conveying the logs into and through a cutting station with opposing curved sides in overlying relation;

sensing the logs prior to the cutting station and producing thereby data representing a replica of the log;

computing the desired curved cutting lines from the data;

providing a saw blade mounted on a vertical arbor;

adjustably positioning the saw blade vertically and angularly as dictated by the computed data for directing the saw blade for cutting along the desired cutting line.

8. A shape sawing apparatus comprising:

a first conveyor system including a sharp chain conveyor engaging a concavely curved side of a log and overlying rollers engaging a convexly curved side of the log;

a sensing device positioned relative to the first conveyor system determining the log configuration and position on the conveyor, and a computer responsive to input from the sensing device and determining therefrom the desired laterally directed cutting lines through the log;

a cutting station positioned at the output end of the first conveyor system and a second conveyor system including at least one vertical feed roller preceding and one vertical feed roller following the cutting station, said feed rollers engaging and conveying the log through the cutting station;

a saw box in the cutting station, and support arms cooperatively and adjustably supporting the saw box, a vertically oriented arbor supported on the saw box and saw blades supported on the arbor;

positioning motors associated with certain of said support arms for selectively producing vertical and tilting motion of the saw box and thereby the arbor and saws mounted thereon, said positioning motors responsive to the computer to selectively and continuously adjust the height and tilt of the saws for producing cutting along the desired cutting lines.

9. A shape sawing system as defined in claim 5 wherein a chipper head is mounted on the saw box for opening a face of the log and thereby a side of a board, said chipper head mounted relative to the arbor and the saw blades on the arbor whereby the opposite side of said board is cut by one of said saw blades to define a specified board thickness, and a secondary positioning motor positioning said blades on said arbor to adjust the blades as the saw box is tilted to retain the relationship necessary to maintain the specified board thickness of said board.

10. A shape sawing system as defined in claim 1 wherein the second conveyor includes an anvil positioned in the cutting station following the first conveyor and adjacent to the cutting saw, said anvil mounted for vertical movement, a positioner positioning said anvil in response to said computer to position the anvil at the lower curved side of the log as the log passes over the anvil, the anvil thereby bottom supporting the log as it passes from the first conveyor into the cutting station.

* * * * *